United States Patent [19]

Weir

[11] Patent Number: 4,814,982
[45] Date of Patent: Mar. 21, 1989

[54] RECONFIGURABLE, MULTIPROCESSOR SYSTEM WITH PROTECTED, MULTIPLE, MEMORIES

[75] Inventor: Kenneth A. Weir, Endicott, N.Y.

[73] Assignee: General Electric Company, Binghamton, N.Y.

[21] Appl. No.: 107,651

[22] Filed: Oct. 9, 1987

Related U.S. Application Data

[63] Continuation of Ser. No. 685,727, Dec. 24, 1984, abandoned.

[51] Int. Cl.⁴ ............................................. G06F 15/16
[52] U.S. Cl. ................................................ 364/200
[58] Field of Search ... 364/200 MS File, 900 MS File

[56] References Cited

U.S. PATENT DOCUMENTS

| | | | |
|---|---|---|---|
| 4,268,904 | 5/1981 | Suzuki et al. | 364/200 |
| 4,383,297 | 5/1983 | Wheatley et al. | 364/200 |
| 4,394,727 | 7/1983 | Hoffman et al. | 364/200 |
| 4,400,775 | 8/1983 | Nozaki et al. | 364/200 |
| 4,402,046 | 8/1983 | Cox et al. | 364/200 |
| 4,404,628 | 9/1983 | Angelo | 364/200 |
| 4,449,181 | 5/1984 | Young et al. | 364/200 |
| 4,459,664 | 7/1984 | Potter et al. | 364/200 |
| 4,539,637 | 9/1985 | DeBruler | 364/200 |
| 4,591,976 | 5/1986 | Webber et al. | 364/200 |

OTHER PUBLICATIONS

Painter, J. A., Memory Privacy Device, IBM Technical Disclosure Bulletin, vol. 14, No. 11, Apr. 1972, p. 3509.

*Primary Examiner*—Thomas M. Heckler
*Assistant Examiner*—Kevin A. Kriess
*Attorney, Agent, or Firm*—I. David Blumenfeld

[57] ABSTRACT

Each processor or input/output (I/O) module in a reconfigurable, multiprocessor system contains a memory in which data for all program tasks is stored, with task data being assigned fixed memory locations. Erroneous entry into the replicated memories due to address faults is prevented by comparing the identity code of the module attempting to write into a particular segment of the memory with the stored identity codes of the processor of I/Os assigned to the task for which data storage into that segment is authorized. If the identity code correspond, data entry is permitted. If they do not, indicating that a processor not assigned to the task is attempting to write [i.e., there is an address error], data entry is prevented. Reassignment of tasks between processors only requires change in the stored identity codes without the need for transfer of the data stored in the memories.

6 Claims, 3 Drawing Sheets

RECONFIGURABLE, MULTIPROCESSOR SYSTEM WITH PROTECTED, MULTIPLE, MEMORIES

This is a continuation of co-pending application Ser. No. 685,727 filed on Dec. 24, 1984, now abandoned.

This invention relates to a multiprocessor system in which the common data memory contained in each of the processors is protected against erroneous data entry.

Redundant, reconfigurable, multiprocessor systems are necessary in fault-tolerant systems such as those used in flight control systems, for example. At any given time, certain processors perform the various program tasks—with all processors having the program for all tasks. As a given processor carries out its assigned task, it stores data in an assigned segment or segments of the memory allocated to that task. Each processor contains a memory in which the data from all active processors in the system are stored. That is, task histories accumulated in the previous iteration are stored not only in the memory associated with the processor carrying out a task, but also in the memory of all the other processors so that tasks may be reassigned between processors which immediately have access to the data relating to a newly assigned task. Each processor or I/O contains a memory (hereinafter being referred to as GLOBAL DATA MEMORY) retaining data from all processors and I/Os performing all of the program tasks.

In systems with such replicated GLOBAL DATA MEMORIES, any address errors, or faults in the data path between the processor which results in address errors, cause data entry at an improper location in the replicated GLOBAL DATA MEMORIES. Data entry at an improper—and therefore unidentifiable—location due to a corrupted address is potentially catastrophic because it may overwrite and destroy critical data.

A need, therefore, exists for a simple and effective memory entry control technique which protects the GLOBAL DATA MEMORIES from processor and bus failures which can result in the entry of data in sections of the memories not assigned a particular task.

GLOBAL DATA MEMORY protection against corrupted addresses is realized in a system having the following characteristics:

Memory replication so that all processor and I/O modules contain GLOBAL DATA MEMORIES (GDMs) storing data for all tasks;

All processors have programs for all tasks;

Data storage allocations in th GDM is segmented and is by tasks;

Memory entry is controlled by processor/task identity validation. Attempts to write into any GDM segment are validated by checking correspondence between identity of processor attempting to write and the identity of the processor assigned to perform the task for which data is to be stored in that segment;

Processor/Bus identity codes identifying the processors assigned to specific tasks and GDM segments are stored in a protective RAM having the same number of segments as the GDM;

The identity codes stored in the RAM are compared with identity code of processor attempting to write to generate either WRITE ENABLE or WRITE INHIBIT signals;

Tasks may be reallocated between processors without shifting data in the GDMs;

Task reallocation is achieved merely by changing Processor/Bus identity codes in the RAM to identify new processor task assignments.

In discussing the GLOBAL DATA MEMORY capacity and the segmentation of the memory capacity, the numerical values will be rounded off for the sake of simplicity. Thus, when reference is made to a 64K memory or a 2K memory segment, it will be understood that the 64K memory actually has a 65,536 byte capacity and the 2K segment has a 2048 byte capacity.

It is, therefore, a principal objective of the invention to provide a system which protects the replicated GLOBAL DATA MEMORIES in a multiprocessor system from address errors.

Another objective of the invention is to provide protection for the replicated memories in a multiprocessor system to insure that processors write data only into segments of the memory authorized to store data for that task.

Still another objective of the invention is to provide a multiprocessor system in which each processor contains a memory storing data from all processors in which access to any segment or segments of the memory are limited to selected ones of the processors.

Other advantages and objectives of the invention will become apparent as the description thereof proceeds.

The foregoing advantages and objectives are realized in a reconfigurable, multiprocessor system. The processor and/or input/output modules each contain a common, distributed GLOBAL MEMORY in which data from all processors and I/Os is stored. The Bus Interface Unit (BIU) of each processor and I/O includes a memory entry control for insuring that a processor writes data into the replicated GLOBAL MEMORIES only in segments which are assigned to store data for tasks assigned to the processor attempting to enter data. This prevents a single faulty address from a processor or bus from writing into and destroying all GLOBAL DATA in such a segment or portion of a segment. A storage element in the form of a RAM having the same number of segments as the memory is provided in each BIU. Processor codes identifying the processors or I/O modules authorized to write into each segment of the GLOBAL MEMORY is stored in the corresponding RAM segment. WRITE access to any given memory segment is allowed only after the processor/bus identity has been compared with the processor identity code stored in the RAM for that segment. If the identity code of the processor attempting the WRITE matches the stored code, an ENABLE signal is generated which allows data from that processor to be written into a particular memory segment.

Other features believed characteristic of this invention are set forth with particularity in the appended claims. The invention itself, however, together with other objectives and advantages thereof will be best understood by reference to the following description taken in conjunction with the accompanying drawings in which:

Figure 1:
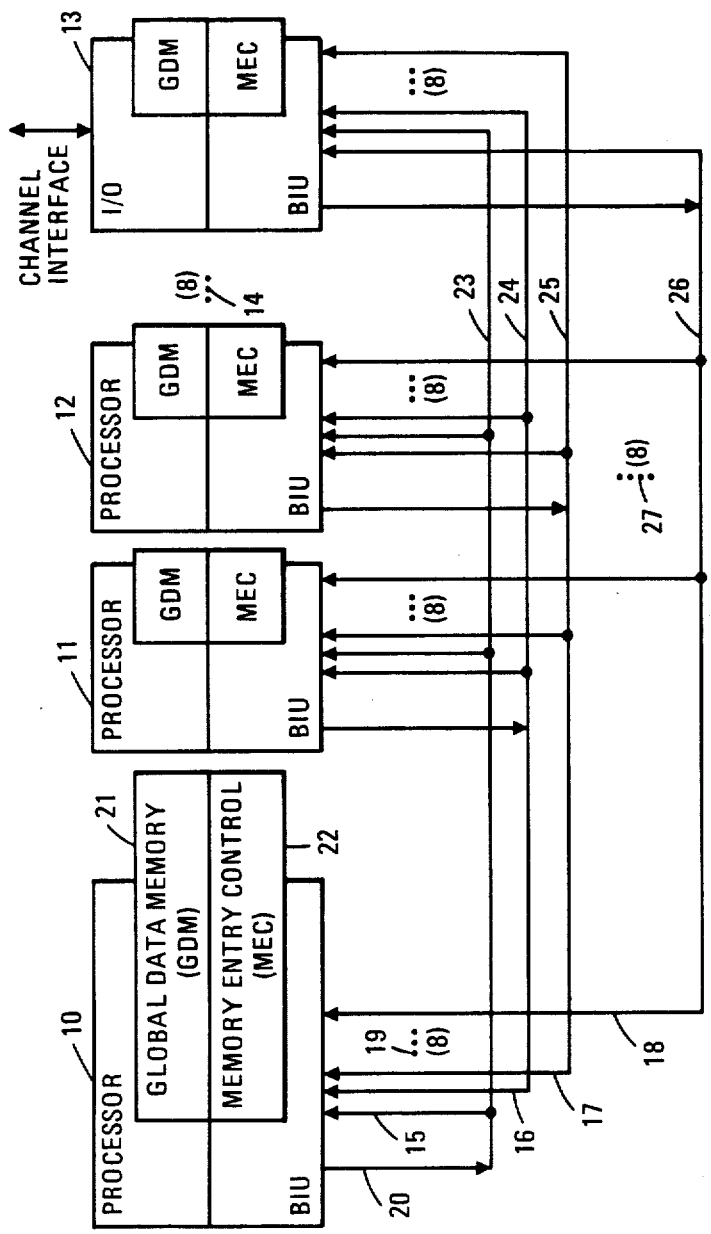
FIG. 1 is a block diagram of a multiprocessor channel showing the processors, I/Os, Bus Interface Units, the GLOBAL DATA MEMORIES and the dedicated serial buses between the processors, etc.

FIG. 1 shows a block diagram of a redundant, reconfigurable, multiprocessor channel with dedicated, broadcast buses having eight (8) processing and/or I/O modules, although the invention is, obviously, not limited to a multiprocessor channel with eight (8) modules. Each module includes a processor or I/O device having a Bus Interface Unit containing a GLOBAL DATA MEMORY in which data from all processors, etc., is stored.

For simplicity of illustration, four (4) modules each incorporating a Bus Interface Unit (BIU) are shown at 10, 11, 12, and 13, with the remaining four (4) being represented by the dots 14. The Bus Interface Unit associated with each processor or I/O device has one output line and eight (8) input lines—one from its own module and one each from the others. Four (4) of the input lines are shown at 15, 16, 17, and 18, with the remaining four (4) being shown by dots 19. The Bus Interface Unit associated with each processor or I/O device contains a common or GLOBAL DATA MEMORY 21 in which data from all active processors and I/Os is stored as well as a Memory Entry Control Network 22 which controls access to the GDM.

The processor and the I/O modules are interconnected by dedicated interprocessor, etc., buses. For an eight (8) processor, I/O system, four of the buses are shown at 23, 24, 25, and 26, with the remaining four (4) being shown by the dots 27. The output line 20 from each Bus Interface Unit is applied to its own BIU, over line 15, and to the remaining processors and input/output units over the dedicated buses. Thus in the system shown in FIG. 1, the Bus Interface Unit associated with each processor and I/O unit receives data and addresses from each of the other processors and I/O units for storage in its associated GLOBAL DATA MEMORY (GDM).

In a redundant channel with eight (8) modules as shown in FIG. 1, a lesser number of the processors, as for example four (4), are assigned to various program tasks at any given time with the remaining ones inactive. The channel may be reconfigured by reassigning tasks to different processors. Thus in a more general sense, this invention relates to any multiprocessor system with n-processors and I/Os per channel in which a lesser number, 'm', perform tasks or simply store data at any given time. If errors are detected, or for a variety of other reasons, one or more active processors may be removed and replaced by other processors since all processors have the programs for all tasks. In addition, MEMORIES must be replicated and they must be GLOBAL. That is, all processors and I/Os, not merely the ones presently assigned to carry out tasks, must store data for all the tasks being carried. Hence, all processors and I/Os, active and inactive, store data from all processors and I/Os carrying out program tasks or storing data so that inactive modules are, at any time, ready to carry out any of the program tasks subsequently assigned to it.

The system is further characterized by the fact that the task data is absolutely mapped in the replicated GLOBAL DATA MEMORIES; i.e. task data is stored in selected, identified segments of the memory, although the amount of memory assigned to data for a specific task may be varied. By segmenting the memory by tasks rather than by processor, reassignment of tasks between processors is easily accomplished and does *not* require shifting of data stored in the memory; i.e., the task histories remain in the same memory location.

With data mapped in the memory by tasks, but with the flexibility of changing task assignments between processors, memory entry control is necessary to assure that data entry is necessary to assure that data entry into specific memory segments is limited to those processors carrying out the tasks for those specific segments.

The replicated GLOBAL DATA MEMORIES are divided into segments which are related to the number of tasks for which data is stored in the memory. For example, in a reconfigurable, eight (8) module channel, eight processors or I/Os may at any time by assigned the program tasks. The GLOBAL DATA MEMORY is then divided into any number—8, 10, 12, etc.

Figure 2:
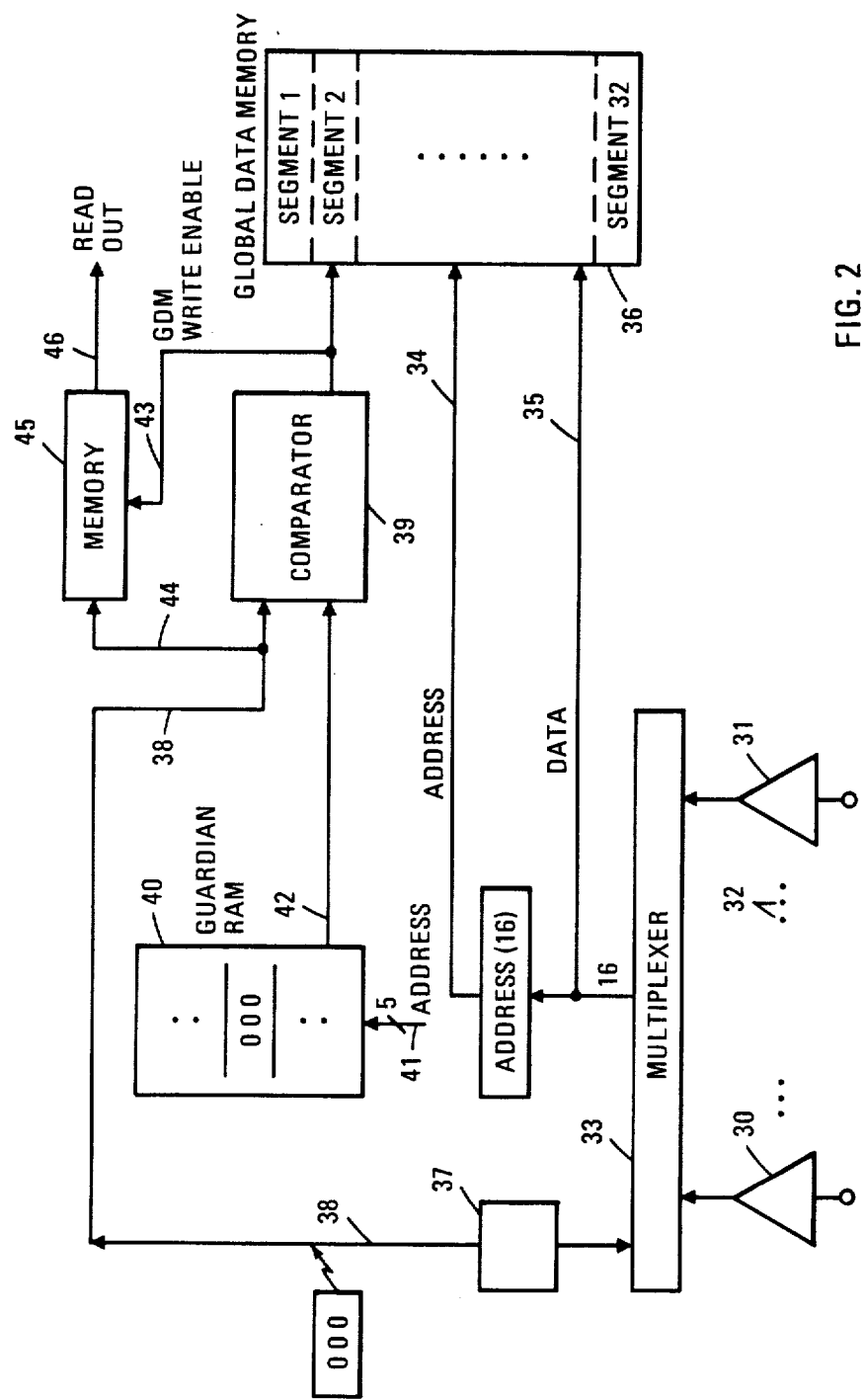
FIG. 2 is a block diagram of a single processor showing the GLOBAL DATA MEMORY and the guardian RAM arrangement for controlling access to the memory.
Figure 3:
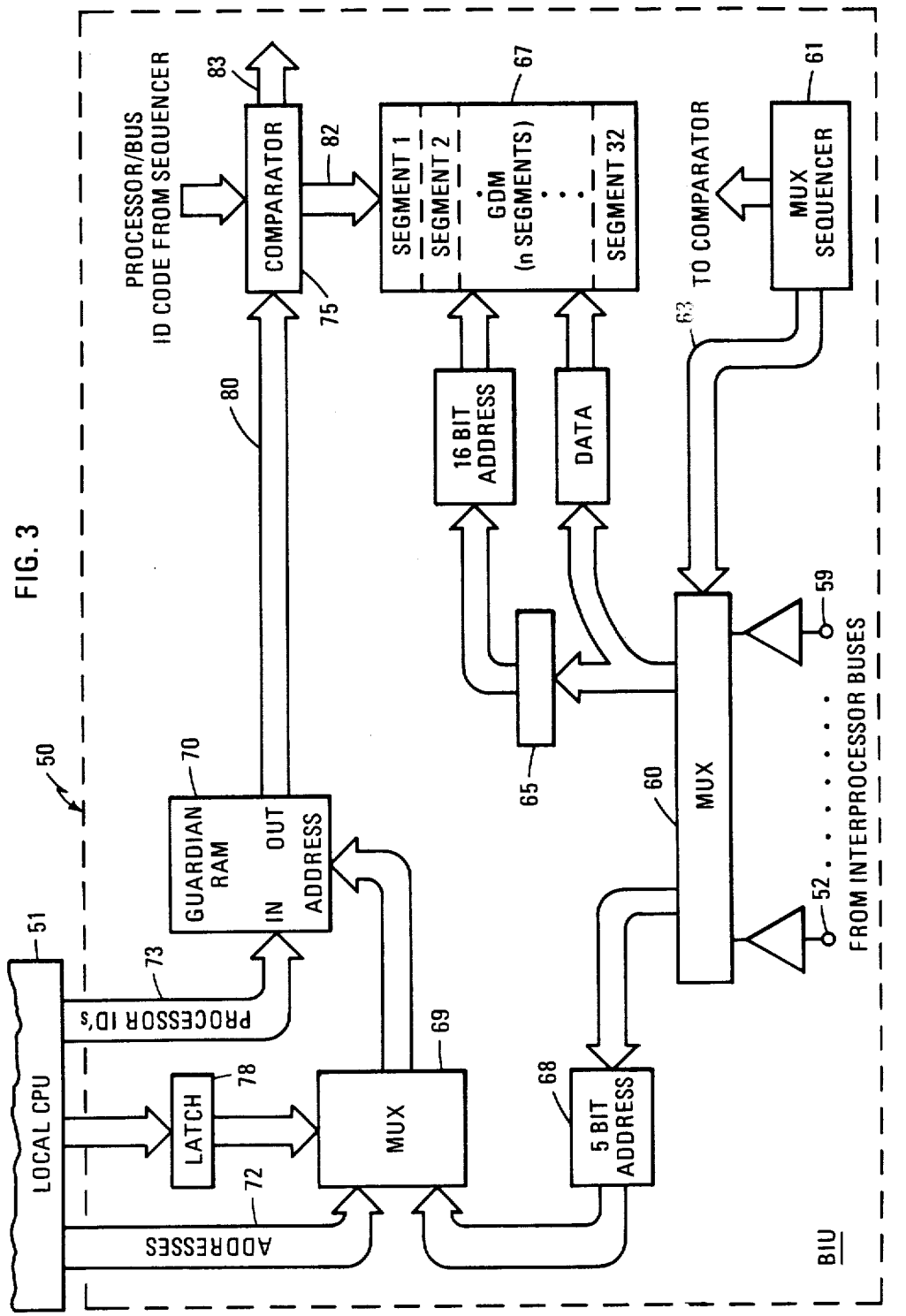
FIG. 3 illustrates preferred form showing entry control of identity codes to the RAM.

The GLOBAL DATA MEMORIES to be described in connection with FIGS. 2 and 3, are preferably 64K memories divided into thirty-two (32) 2K segments. An active processor or I/O device has access to at least one (1) memory segment but may have access to a plurality of segments.

FIG. 2 illustrates one form of the novel system for protecting the GLOBAL DATA MEMORIES against loss of data due to address errors. In FIG. 2, data entry control into th GDM is achieved by processor/task identity validation through the medium of a Random Access Memory (RAM) which stores the identity codes of the processors/IDs authorized to write in any segment because its assigned task is the one reserved for the addressed segment.

The guardian RAM has the same number of segments as the GDM and each segment in the guardian RAM holds a processor code identifying the processor, or I/O device entitled to write into that segment. The segment address from the processor attempting to WRITE is applied to the guardian RAM and causes the RAM to output the processor identity code assigned to that task [for that segment] and therefore authorized to enter data into that GDM segment. This identity code must match the identity code of the processor code attempting to WRITE. If it does, an Enable signal is generated to permit the data write to occur to the identified GDM segment. If the identity code stored in the RAM and the identity code do not match, data entry is inhibited.

FIG. 2 shows the inputs from an eight (8) module channel to carry out program tasks and store data in the replicated GLOBAL DATA MEMORIES at any given time. The input ports for the receivers, two of which are shown at 30 and 31 and the remainder by the dots 32, are coupled to the interprocessor buses, not shown. The receivers couple address information and data from the active processors or I/Os to multiplexer 33 which sequentially transmits them over address and data buses 34 and 35 to GLOBAL DATA MEMORY 36. With a 64K GDM, each of the thirty two (32) memory segments has a 2K byte capacity and a 16-bit address is required for the 32 segment, 64K memory. Five (5) address bits identify the memory segments and the remaining eleven (11) bits are segment offset bits—those required to address within the 2K segments.

Multiplexer 33 is controlled by MUX sequence controller 37, which sequentially actuates the multiplexer channels to transmit addresses and data from the receivers to the GLOBAL MEMORY. As sequencer 37 actuates each MUX channel it also transmits a three-bit code over line 38 identifying the processor/bus/receiver ID. Line 38 is one input to Comparator 39 in which the ID code for the processor attempting to WRITE into the memory, is compared with an identity code (stored in RAM 40) of the processor assigned to the task. To this end, the five-bit address, for the specific segment of the GDM, is also applied over line 41 to the address input of guardian RAM 40 which has the same number of segments as the GLOBAL DATA MEMORY. Each RAM segment stores a processor identity code identifying the processor carrying out the task for which data is to be stored in that segment of the memory. The three-bit identity code stored in the RAM segment corresponding to the segment address bits are transmitted over output line 44 to the other input of Comparator 39. The two identity codes are compared. If the three-bit identity codes of the inputs of Comparator 39 are identical, a WRITE ENABLE signal from Comparator 39 is transmitted over line 43 to the GLOBAL DATA MEMORY permitting the data to be stored in the particular segment. If the two identity bits do not correspond, a WRITE INHIBIT signal is produced, which prevents any data entry into the segment because the processor/bus attempting to store data in that particular segment or segments is not performing the task for which data storage is authorized in those segments.

The processors identity code from Sequencer 37 is also applied as one input to memory 45 which records unauthorized access attempts to the GDM as well as the identity of the processor attempting to do so. The output from Comparator 39 is also applied as a control signal to memory 45. If the Comparator output is a WRITE INHIBIT signal, the identity code from line 38 is stored in the memory. That is, if an inhibit signal is generated indicating a mismatch and an attempt by an unauthorized processor to store data, the memory enters the identity key of the processor attempting to store data improperly. The identity codes of processors attempting forbidden access may then be read out or stored in a counter by means of readout bus 46 from the memory.

Each task is assigned a minimum of one segment in the GLOBAL MEMORY with some tasks being assigned a plurality of segments. The segments are sized to fit the smaller or larger task requirements, resulting in an efficient utilization of the GLOBAL MEMORY and permanent mapping of data into the memory. The significance of the latter is, of course, that if tasks are reassigned between processors, for whatever reason, no data transfer within the memories is required. If there are any new assignments of tasks, the new processors must be allowed to write into different segments. The only changes required, is within the guardian RAM which must be loaded with a new set of processor identity codes.

FIG. 3 is another embodiment of the invention which illustrates both the replicated GLOBAL DATA MEMORY with memory entry control through a guardian RAM, but also shows the manner of entering or changing the processor identity codes in the RAM. FIG. 3 shows a Bus Interface Unit 50 between the local processor, shown schematically at 51, and the dedicated buses. The receiver input ports 52–59 from the buses are coupled to multiplexer 60. Multiplexer 60, in a manner similar to that shown in FIG. 2, is controlled from a Sequencer 61 to transmit data from the individual receivers sequentially. The Sequencer controls multiplexer 60 over a control bus 63 as the receivers are sequentially coupled through the multiplexer to the data and address buss 64 and 65 associated with the GLOBAL DATA MEMORY. Sequencer 61 also transmits processor/bus identity codes to Comparator 75 as each bus/processor receiver is actuated. The other input to Comparator 75 is a stored segment ID code from RAM 70 to determine whether the processor attempting to write into a particular segment is the processor assigned to the task for which storage is permitted in that segment.

The five most significant address bits, i.e., those address bits identifying the GLOBAL DATA MEMORY segments, are also extracted by a five-bit address circuit 68 and applied as one input to multiplexer 69, the output of which is coupled to the address input terminal of guardian RAM 70. The other input to multiplexer 69 is from the central processing unit over address bus 72. Multiplexer 69 applies the segment addresses to the RAM segment ADDRESS terminal either from the processors or I/Os attempting to write into the GDM or from the local CPU which, upon start-up or upon task reassignment between processors, stores the processor I/O access codes in the RAM.

Upon start-up, or in the event of reconfiguration of the processors by task reassignment between the processors or I/Os in the channel, the Central Processor Unit (CPU) software sets latch 78 connected between the CPU and a two-channel multiplexer 69. Setting of latch 68 activates one MUX channel to transmit segment addresses from the CPU to the RAM and simultaneously disables the other MUX channel to inhibit passage of the five-bit segment identity codes from address circuit 68.

After latching, address codes from the CPU are transmitted over bus 72 to the address input of RAM 70, addressing each of the 32 address segments in the RAM sequentially. Simultaneously, processor identity codes are transmitted over bus 73 to the data input of RAM 70 to store the processor identity codes in the respective segments of the RAM. The processor identity codes stored in the individual RAM segments are utilized to Enable or Inhibit writing of data into the GLOBAL MEMORY.

After the processor ID codes have been stored in the RAM, latch 78 is reset and multiplexer 69 now permits passage of the five-bit segment addresses from multiplexer 60 to the address input of RAM 70. Thus, after initialization or reconfiguration, the five (5) bit segment address identifying the GLOBAL DATA MEMORY segment which is being addressed is applied to RAM 70. Guardian RAM 70 transmits the identity code stored in that segment of the RAM to Comparator 75 over bus 80.

If the identity codes from Sequencer 61 and from RAM 70 correspond, a write enable signal is generated which is transmitted to the GLOBAL DATA MEMORY over bus 82 and permitting entry of the data from that particular receiver and processor. If, on the other hand, the two identity codes do not match, a write inhibit signal is transmitted to the GLOBAL DATA MEMORY preventing entry of data into that segment and providing an indication that an improper attempt to write into a particular segment has been made and also identifying the processor attempting such an improper data entry with the latter being transmitted for storage to a memory, not shown, over bus 83.

In this fashion, memory entry control for a system having replicated GLOBAL DATA MEMORIES associated with each processor or input/output device of a reconfigurable, multiprocessor channel is readily achieved. It will also be apparent, that the system permits reassignment of tasks between processors while avoiding transfer of stored data related to the reassigned tasks within the replicated memories.

While particular embodiments of this invention have been shown, it will be understood that the invention is by no means limited thereto, since many modifications, both in the structural arrangement, the instrumentalities employed may be made. It is contemplated by the appended claims to cover any such modifications as fall within the true spirit and scope of this invention.

What is claimed as new and desired to be secured by U.S. Letters Patent is:

1. In a reconfigurable, multiprocessor system, a combination comprising:

(a) a plurality of processors and input/output devices interconnected by dedicated buses between said processors and input/output devices for transmitting data from every processor and input/output device to every other processor and input/output device, each of said processors containing a program for performing a plurality of tasks whereby each processor or input/output device is capable of interchangeably performing all of the plurality of tasks in the entire program;

(b) individual, replicated data memory means in each processor and input/output device for storing data from its own and all other processors and input/output devices whereby the data for the entire reconfigurable, multiprocessor system is stored in the individual, replicated data memories of each processor and input/output device; each of said individual, replicated data memory means having a plurality of segments with each of such plurality of segments selectively being allocated to store data associated with specific ones of said plurality of program tasks assigned to and performed by specific ones of the processors or input/output devices; and (c) each of said processor and input/output devices containing data memory entry control means coupled to the dedicated data buses from all processors and devices for controlling entry of data from said buses into any one of the plurality of memory segments in said replicated memory, said memory entry control means including means for comparing and validating the identity code of the processor or input/output device transmitting data over said buses and attempting to enter data into a segment against the identity code of the processor(s) and input/output devices assigned to perform tasks for which data storage is authorized in that segment.

2. The reconfigurable, multiprocessor system according to claim 1 wherein said validation means includes means for comparing the identity codes of the authorized processors or input/output devices for the respective segments to the identity code of the processor or input/output device attempting to enter data into a given segment to permit data entry if the processor identity is validated and to prevent data entry if failure to validate indicates an addressing error.

3. The reconfigurable, multiprocessor system according to claim 2 wherein said validation means includes a further segmented Memory having the same number of segments as the said data memory, each segment of said further memory having a processor identity code stored therein identifying the processor carrying out the task authorized for data storage in that segment of the data memory, and means for permitting data entry into such segment if the proper identity code is stored in the corresponding segment of the further memory.

4. The reconfigurable, multiprocessor system according to claim 3 wherein said further segmented memory in said validation means comprises a segmented Random Access Memory (RAM) having the same number of segments as said replicated data memory, said RAM segments containing identity codes identifying authorized processors or input/output devices, means for applying the data memory segment address from the received data from the processor or input/output device attempting to enter data in a particular segment of the data memory to the input of said RAM whereby the output from the RAM is the processor identity code stored in the address RAM segment, means for comparing the processor identity code from said RAM segment and the identity code contained in the data from the processor or input/output device attempting to store data to produce an enabling signal when the codes match, and inhibiting signal when they do not, and means for a applying said enabling and inhibiting signals to said individual replicated data memories to control data entry to said memory.

5. The reconfigurable, multiprocessor system according to claim 4 including multiplexing means coupled to said interprocessor buses for receiving data and addresses from the processors and I/Os, means for sequentially actuating the multiplexing channels to transmit data and addresses to said data memory.

6. The reconfigurable, multiprocessor system according to claim 5 including means for reassigned processor identity codes in said RAM including means for interrupting transmission of segment address information from said multiplexing means to said RAM and to transmit segment address information and new identity codes to said RAM.

* * * * *